United States Patent [19]

Acitelli et al.

[11] Patent Number: 5,076,843

[45] Date of Patent: Dec. 31, 1991

[54] NONAQUEOUS THERMALJET INK COMPOSITIONS

[75] Inventors: Mario A. Acitelli; Charles J. Merz, III, both of Charlotte; Frank M. Rose, Jr., Kannapolis; John C. Smith, Huntersville, all of N.C.

[73] Assignee: Lexmark, International, Inc., Lexington, Ky.

[21] Appl. No.: 427,409

[22] Filed: Oct. 27, 1989

[51] Int. Cl.$^5$ .............................................. C09D 11/02
[52] U.S. Cl. ........................................ 106/22; 106/20
[58] Field of Search .................................... 106/22, 20

[56] References Cited

U.S. PATENT DOCUMENTS

| | | | |
|---|---|---|---|
| 3,486,912 | 12/1969 | Dyson | 106/22 |
| 3,551,170 | 12/1970 | Kuster | 106/22 |
| 4,106,027 | 8/1978 | Hoffmann et al. | 106/22 |
| 4,153,467 | 5/1979 | Yano et al. | 106/22 |
| 4,290,072 | 9/1981 | Mansukhani | 106/20 |
| 4,361,843 | 11/1982 | Cooke et al. | 106/22 |
| 4,386,961 | 6/1983 | Lin | 106/22 |
| 4,395,287 | 7/1983 | Kobayashi et al. | 106/22 |
| 4,610,554 | 9/1986 | Suzuki et al. | 106/20 |

FOREIGN PATENT DOCUMENTS 025464 2/1980 Japan .

*Primary Examiner*—William R. Dixon, Jr.
*Assistant Examiner*—Helene Klemanski
*Attorney, Agent, or Firm*—Bell, Seltzer, Park & Gibson

[57] ABSTRACT

The present invention provides nonaqueous thermaljet ink compositions having improved print uniformity, drying time, and waterfastness. The nonaqueous thermaljet ink compositions of the present invention are formulated by combining a solvent dye colorant and two or more miscible nonaqueous solvents, at least one being volatile and one being nonvolatile. More specifically, the solvents are combined in such relative concentrations that drying time is reduced when the composition is thermaljet printed onto a substrate and solubility of the dye is not seriously compromised when the volatile solvent evaporates.

13 Claims, No Drawings

NONAQUEOUS THERMALJET INK COMPOSITIONS

The present invention relates to nonaqueous ink compositions that possess improved drying time, printability and waterfastness.

BACKGROUND OF THE INVENTION

Bubblejet or thermaljet printing technology is a liquid ink variety of the drop-on-demand ("DOD"), as opposed to continuous, inkjet printing technology. Generally, thermaljet technology involves rapidly heating a small volume of ink in an enclosed reservoir. As the ink in the reservoir volatilizes a discrete quantity is ejected through a port or nozzle, which in turn directs the ink droplet onto the desired substrate.

Because so many of the physicochemical characteristics of the ink composition are at play in thermaljet systems, development of such inks requires that careful attention be given to identifying the acceptable ranges for such characteristics. For example, print quality is directly affected by the surface tension, opacity and viscosity of the jet ink composition, as well as the presence of certain additives. Boiling point (volatility) of the fluid carrier(s) is also an important factor.

Early development of ink compositions for thermaljet systems focused on adapting preexisting water-based, or aqueous, compositions to fit the mechanical and physicochemical limitations of thermaljet. While these efforts have met with some success, several drawbacks of the aqueous inks persist. Among the most significant drawbacks of the aqueous inks is their prolonged drying time (10-50 seconds). Because the fluid carrier of these compositions, water, has a slow evaporation rate, the ink remains wet as the paper reaches the stacking tray. As a result, the ink is often smudged as other pages are stacked on the freshly printed page or when the page is otherwise handled.

While mechanical means for curing this problem have been devised, they have drawbacks of their own. For example, one approach feeds the printed page through a stream of warm air on its way to the stacker; this adds both expense and bulk to a printer that counts among its most significant advantages compact size and portability. Yet another approach is simply to lengthen the paper path, giving the ink more time to dry before the pages are stacked, this also adds undesired bulk to the system.

Another approach to creating a smudge-proof image is the addition of chemical penetrants. These penetrants, e.g., butyl cellosolve, increase the penetration rate of the ink thereby shortening the drying time. However, penetrants may reduce print quality, e.g., feathering, due to increased capillary action and hence lateral spreading of the ink. Furthermore, because today's office systems utilize such a variety of paper types and quality, each varying in fiber construction, the amount of feathering will vary with the type of paper utilized, thereby reducing uniformity of print quality across paper types.

Another drawback of the aqueous ink compositions is the difficulty involved in creating a waterfast image. Because the dye colorants of the aqueous compositions are necessarily water soluble they are subject to smearing when contacted with water even after the ink has dried.

Yet another drawback associated with the use of aqueous thermaljet ink compositions is the need for additives in the ink. Because the ink remains exposed to the atmosphere between uses, evaporation of the fluid carrier can result in deposition of solids inside the nozzle or reservoir, which in turn can clog the nozzle or in less extreme cases simply cause a reduction of print clarity. To reduce clogging many ink compositions contain humectants, which are additives that improve moisture retention. While improved moisture retention rectifies one problem, it exacerbates the problem observed with the long drying time of aqueous inks.

The dye colorants themselves used in the aqueous inks also present problems. These dyes, e.g., azo dyes, are generally susceptible to thermal decomposition. Because many of the dyes, per se, are not water soluble, they often contain polarizing substituent groups, e.g. sulphate moieties, to improve water solubility. When thermal decomposition occurs the molecular dye is cleaved into two or more molecular fragments. Often, only one of these fragments will retain the polarizing substituent, and hence water solubility. The other fragments, no longer water soluble, precipitate out of solution to either clog the nozzle or build up decomposition products on the heating element in the reservoir. Such a build up, referred to as kogation, can act as an insulator reducing the heating efficiency of the element, which in turn will impair bubble formation, and may ultimately burn out the heating element. Such loss of individual inkjets reduces the print quality of the system.

Similarly, biocides, another common additive of aqueous ink compositions, are likewise susceptible to thermal decomposition, and accordingly the drawbacks associated therewith.

SUMMARY OF THE INVENTION

The ink compositions of the present invention are formulated by strategically selecting two or more miscible nonaqueous solvents that have substantially different volatilities and specific solubilizing effects on organic solvent soluble dye colorants.

As such, the present invention provides nonaqueous thermaljet ink compositions that have improved drying time, waterfastness and print quality. More specifically, ink compositions of the present invention have a dry time of 5 seconds or less on most paper types. Because of the improved drying time, additives, e.g., penetrants, are not required and print quality is improved. Furthermore, because the carriers are nonaqueous the dyes are not water soluble thereby providing a waterfast image.

The compositions of the present invention also have reduced tendency to result in the failure of individual inkjets, which may be caused by either evaporation of the fluid carrier or as a result of the build up of products associated with decomposition of dye colorants or additives, and avoids the problems associated therewith.

These compositions are storage stable and are compatible with existing thermaljet printing equipment. In fact, they may actually prolong the useful life of the printheads. For example, by lowering the ionic content of the composition, the effect of chemical etching on the heater passivation materials is reduced. Additionally, by removing the water from the solvent system there is less deterioration of some adhesives that are used in construction of the printhead.

THE INVENTION

The compositions of the present invention provide nonaqueous thermaljet ink compositions comprising a solvent dye colorant, a volatile solvent in which the dye is at least moderately soluble, and a nonvolatile solvent in which the dye is highly soluble.

By solvent dye we mean any dye that can be effectively solubilized by an organic solvent. Examples of such dyes are found in 5 The Society of Dyers and Colourists, Colour Index, pp. 5231–5244, (3rd ed. 1971). Effectively solubilized means that the solvent has sufficient solubilizing capacity for that dye that it can dissolve enough dye to create a printed image with the desired optical density and color when printed with conventional thermaljet printers on a substrate. The ink compositions of the present invention preferably comprise about 2–8% by weight of a solvent dye colorant, and most desirably about 3–5% by weight of a solvent dye colorant.

By volatile solvent we mean an organic solvent that has a boiling point (at 1 atm.) of 120° C. or less. The ink compositions of the present invention preferably comprise about 10–60% of a volatile organic solvent. Some of the more preferred ink compositions of the present invention comprise about 40–50% of a volatile organic solvent.

Volatile organic solvents useful in the present invention are those in which the solvent dye colorants are moderately soluble. For purposes of this invention, a dye colorant is moderately soluble in a solvent if a sufficient concentration of the dye colorant can be solubilized in the solvent to formulate an ink composition that creates an image having the desired optical density when thermaljet printed and dried on a substrate. If the dye colorants are not at least moderately soluble in the volatile component then too much of the nonvolatile solvent will be required and the utility of the composition may be compromised by high viscosity and/or low volatility. Presently preferred volatile solvents include monohydric alcohols. More specifically, preferred volatile solvents include the monohydric aliphatic alcohols, for example, methanol, ethanol, 1-propanol, and 2-propanol.

By nonvolatile solvent we mean an organic solvent that has a boiling point (at 1 atm.) of more than 120 C. Nonvolatile solvents useful in the present invention are those in which the solvent dye colorant is highly soluble. For purposes of this invention, highly soluble means that the solvent has the capacity to solubilize a sufficient concentration of the dye that the solvent will not be supersaturated with dye when the volatile solvent evaporates. Preferably, the nonvolatile solvent should be able to solubilize at least about twice as much dye as is required to formulate an ink composition that is sufficiently concentrated in dye colorant to create an image having the desired optical density when thermaljet printed and dried on a substrate. Nonvolatile solvents useful in the present invention include dihydric, trihydric, and polyhydric alcohols, and further include nonvolatile ketones. Preferred nonvolatile solvents include diols, derivatives, and condensation products thereof. Examples of such nonvolatile solvents are ethylene glycol, diethylene glycol, 1,4-butanediol, methoxytriglycol and polyethylene glycols (PEG), especially PEG 200. Yet another preferred nonvolatile solvent capable of effectively solubilizing solvent dyes is N-methyl-2-pyrrolidone.

If the dye colorants are not at least highly soluble in the nonvolatile component crusting will occur in and around the nozzle when the volatile component has evaporated, e.g., from the nozzle face upon standing, and print quality will be compromised. If, on the other hand, the nonvolatile component is chosen with this excess solubilizing capacity, then, despite evaporation of the volatile component, the dye will nonetheless remain solubilized by the nonvolatile component, thereby reducing crusting.

In addition to reduced clogging of the ink jets, the compositions of the present invention reduce the amount of kogation in thermaljet systems. The fluid carriers used in the compositions of the present invention generally do not require a polarizing substituent on the dye molecule, per se, to solubilize the dye colorant. When thermal decomposition of the dye occurs in this nonaqueous media there is no selective solubilizing of the decomposition products based on the presence of the polarizing substituent. The thermal decomposition products are readily removed due to the excess solubilizing capacity of the solvents. Similarly, the compositions of the present invention do not require biocides, penetrants, and other additives that contribute to kogation. As a result there is less kogation and the useful life of the printhead is extended.

EXAMPLE

We dissolved six grams of a dye mixture of equal parts of Iosol Black (C.I. Solvent Black 13) and Iosol Orange (C.I. Solvent Orange 23) in 54 grams of ethylene glycol and 40 grams of 2-propanol. Using both HP Deskjet and HP Thinkjet thermaljet printers, the ink composition was printed on a variety of papers including: Xerox 4024, Gilbert Lancaster Bond, Chandour, Nopafix Woodfree Copier, as well as others. Drying time was under five (5) seconds on all of the papers tested. Furthermore, print dot diameter was approximately the same on all of the papers, indicating that drying time had occurred before ink spreading had taken place.

Other examples of preferred nonaqueous thermaljet ink compositions formulated in accordance with the present invention are set forth in Table I below:

TABLE I

| | |
|---|---|
| Intraplast CN | 5% |
| ethylene glycol | 55% |
| 2-propanol | 40% |
| Intraplast CN | 5% |
| ethylene glycol | 45% |
| N-methyl-2-pyrrolidone (NM2P) | 10% |
| ethanol | 40% |
| Neptun Black FF | 2.5% |
| ethylene glycol | 57.5% |
| 2-propanol | 40.0% |
| Intraplast CN | 5% |
| NM2P | 75% |
| 2-propanol | 20% |
| Intraplast CN | 5% |
| ethylene glycol | 55% |
| ethanol | 40% |
| Iosol Black (C.I. Solvent Black 13) | 5% |
| diethylene glycol | 75% |
| methanol | 20% |
| Iosol Black (C.I. Solvent Black 13) | 3% |
| ethylene glycol | 57% |
| 2-propanol | 40% |
| Solvent Black 7 | 3% |
| ethylene glycol | 57% |

TABLE I-continued

| 2-propanol | 40% |
|---|---|
| Neptun Black FF | 3% |
| 1,4-butanediol | 57% |
| methanol | 40% |
| Intraplast CN | 5% |
| Carbowax 200 | 20% |
| 2-Propanol | 75% |

(All percentages calculated on a weight percent basis).

What is claimed is:

1. A nonaqueous ink composition comprising:
   2-8% by weight of a solvent dye colorant;
   10-60% by weight of a volatile solvent in which the dye is at least moderately soluble; and
   40-85% by weight of nonvolatile solvent in which the dye is highly soluble selected from the group consisting of dihydric and trihydric alcohols;
   and which is suitable for use in a thermaljet, drop-on-demand inkjet system.

2. The thermaljet ink composition of claim 1 comprising:
   about 3-5% by weight of said solvent dye colorant;
   about 40-50% by weight of said volatile nonaqueous solvent; and
   about 45-55% by weight of said nonvolatile solvent.

3. The ink composition of claim 1 wherein the nonvolatile nonaqueous solvent is selected from the group consisting of ethylene glycol, diethylene glycol, 1,4-butanediol and methoxytriglycol.

4. The ink composition of claim 1 wherein the volatile nonaqueous solvent is a monohydric aliphatic alcohol.

5. The ink composition of claim 4 wherein the volatile nonaqueous solvent is selected from the group consisting of methanol, ethanol, 1-propanol, and 2-propanol.

6. The ink composition of claim 1 further comprising N-methyl-2-pyrrolidone.

7. A thermaljet ink composition comprising:
   Intraplast CN 5%;
   ethylene glycol 55%; and
   2-propanol 40%.

8. A thermaljet ink composition comprising:
   Solvent soluble blue dye CN 5%;
   ethylene glycol 45%;
   N-methyl-2pyrrolidone 10%; and
   ethanol 40%.

9. A thermaljet ink composition comprising:
   C.I. Solvent Black 13 3%;
   C.I. Solvent Orange 23 3%;
   ethylene glycol 54%; and
   2-propanol 40%.

10. A method for producing a printed article having a waterfast image comprising thermaljet printing said image on a substrate utilizing the nonaqueous ink composition of claim 1.

11. A method for improving the print quality and drying time of a thermaljet printed image comprising printing said image utilizing the nonaqueous thermaljet ink composition of claim 1.

12. In a method of thermaljet printing wherein a volatile ink composition is rapidly heated and discharged onto a substrate, the improvement wherein the ink composition comprises a solvent dye colorant, a nonaqueous volatile solvent in which the dye is at least moderately soluble, and a nonaqueous nonvolatile solvent in which the dye is highly soluble selected from the group consisting of dihydric and trihydric alcohols.

13. The method of cliam 12 wherien the ink composition comprises 2-8% of said solvent dye colorant, 10-60% of said nonaqueous volatile solvent, and 40-85% of said nonaqueous nonvolatile solvent, all pecentages by weight.

* * * * *

UNITED STATES PATENT AND TRADEMARK OFFICE
CERTIFICATE OF CORRECTION

PATENT NO. : 5,076,843
DATED : December 31, 1991
INVENTOR(S) : Acitelli; Merz, III; Rose, Jr.; and Smith It is certified that error appears in the above-identified patent and that said Letters Patent is hereby corrected as shown below:

Col. 1, Line 5, after "nonaqueous", insert --thermaljet--.

Col. 3, Line 46, delete "120" and insert --120°--.

Col. 6, Line 4, delete "Intraplast CN" and insert --Solvent soluble blue dye--.

Col. 6, Line 8, after "dye", delete --CN--.

Col. 6, Line 33, delete "cliam" and insert --claim--.

Signed and Sealed this

Seventh Day of December, 1993

Attest:

BRUCE LEHMAN

*Attesting Officer*  *Commissioner of Patents and Trademarks*